United States Patent
Baars et al.

(10) Patent No.: US 10,810,007 B2
(45) Date of Patent: Oct. 20, 2020

(54) CLASSIFYING SYSTEM-GENERATED CODE

(71) Applicant: Microsoft Technology Licensing, LLC, Redmond, WA (US)

(72) Inventors: Arthur Baars, Oxford (GB); Sebastiaan Johannes van Schaik, Oxdord (GB)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 16/229,569

(22) Filed: Dec. 21, 2018

(65) Prior Publication Data
US 2019/0205122 A1    Jul. 4, 2019

Related U.S. Application Data

(60) Provisional application No. 62/611,733, filed on Dec. 29, 2017.

(51) Int. Cl.
*G06F 9/44* (2018.01)
*G06F 8/71* (2018.01)
(Continued)

(52) U.S. Cl.
CPC ............ *G06F 8/71* (2013.01); *G06F 8/41* (2013.01); *G06F 16/9024* (2019.01); *G06K 9/6267* (2013.01)

(58) Field of Classification Search
CPC .......... G06F 8/41; G06F 8/71; G06F 16/9024; G06K 9/6267
(Continued)

(56) References Cited

U.S. PATENT DOCUMENTS

| | | |
|---|---|---|
| 4,860,203 A | 8/1989 | Corrigan |
| 5,432,942 A | 7/1995 | Trainer |
| (Continued) | | |

FOREIGN PATENT DOCUMENTS

| | | |
|---|---|---|
| CN | 101937389 | 1/2011 |
| WO | WO 2003/021433 | 3/2003 |

OTHER PUBLICATIONS

"Apache Commons BCEL—Byte Code Engineering Library", Feb. 18, 2014, retrieved from the Internet on Dec. 23, 2014 at http://commons.apache.org/proper/commons-bcel/manual.html, 17 pages.

(Continued)

*Primary Examiner* — Ted T. Vo
(74) *Attorney, Agent, or Firm* — Workman Nydegger

(57) ABSTRACT

Methods, systems, and apparatus, including computer programs encoded on computer storage media, for classifying system-generated code. One of the methods includes generating data representing a state of source code files of the snapshot before performing a build process for the snapshot. An instrumented build process is performed for the snapshot, including intercepting each compiler call of a plurality of compiler calls by the build process for the snapshot, and designating one or more respective source code files of each compiler call as source code files compiled during the build process for the snapshot. One or more source code files that are new or were modified after the build process was initiated are classified as source code files having system-generated source code.

18 Claims, 3 Drawing Sheets

(51) Int. Cl.
  *G06F 16/901* (2019.01)
  *G06K 9/62* (2006.01)
  *G06F 8/41* (2018.01)

(58) Field of Classification Search
  USPC ......... 717/106, 120–122, 130–131, 140–141
  See application file for complete search history.

(56) References Cited

U.S. PATENT DOCUMENTS

| | | |
|---|---|---|
| 5,920,721 A | 7/1999 | Hunter |
| 6,175,627 B1 | 1/2001 | Petrovic et al. |
| 6,381,735 B1 | 4/2002 | Hunt |
| 6,567,816 B1 | 5/2003 | Desai et al. |
| 7,340,726 B1 | 3/2008 | Chelf et al. |
| 7,571,434 B1 | 8/2009 | Kamen et al. |
| 7,730,451 B2 | 6/2010 | Styles et al. |
| 7,770,202 B2 | 8/2010 | Brumme et al. |
| 7,805,717 B1 | 9/2010 | Spertus et al. |
| 7,856,624 B2 | 12/2010 | Plum |
| 8,347,272 B2 | 1/2013 | Sugawara et al. |
| 8,468,498 B2 | 6/2013 | Lee et al. |
| 8,479,170 B2 | 7/2013 | Prasad et al. |
| 8,479,178 B2 | 7/2013 | Aharoni et al. |
| 8,706,964 B1 | 4/2014 | Koh et al. |
| 8,832,829 B2 | 9/2014 | Manni et al. |
| 9,075,630 B1 | 7/2015 | Smith et al. |
| 9,110,737 B1 | 8/2015 | Tibble et al. |
| 9,208,056 B1 * | 12/2015 | Henriksen ........... G06F 11/3604 |
| 9,262,157 B2 | 2/2016 | Henriksen et al. |
| 9,378,013 B2 * | 6/2016 | Tibble ....................... G06F 8/75 |
| 9,489,182 B1 | 11/2016 | Cawley |
| 9,612,850 B2 | 4/2017 | Tibble et al. |
| 9,645,804 B2 | 5/2017 | Tibble et al. |
| 9,946,525 B2 | 4/2018 | Tibble et al. |
| 2004/0025152 A1 | 2/2004 | Ishizaki et al. |
| 2006/0059472 A1 | 3/2006 | Mak et al. |
| 2006/0064676 A1 | 3/2006 | Chavan et al. |
| 2007/0055963 A1 | 3/2007 | Waddington et al. |
| 2007/0198971 A1 | 8/2007 | Dasu et al. |
| 2009/0235239 A1 | 9/2009 | Lee et al. |
| 2010/0023926 A1 | 1/2010 | Sugawara et al. |
| 2011/0055806 A1 | 3/2011 | Chicherin et al. |
| 2011/0289586 A1 | 11/2011 | Kc et al. |
| 2012/0167065 A1 | 6/2012 | Urakhchin |
| 2012/0233599 A1 | 9/2012 | Valdiviezo Basauri et al. |
| 2013/0139132 A1 | 5/2013 | Kass et al. |
| 2013/0311459 A1 | 11/2013 | Koide et al. |
| 2014/0059513 A1 | 2/2014 | Sabo |
| 2015/0007140 A1 | 1/2015 | Boshernitsan et al. |
| 2016/0179502 A1 * | 6/2016 | Cawley ..................... G06F 8/54 717/121 |
| 2017/0199732 A1 | 7/2017 | Tibble |

OTHER PUBLICATIONS

Chacko, M.; Jacob, P., "Validation of Embedded Software through Static Analysis of Machine Codes," Advance Computing Conference, 2009. IACC 2009. IEEE International, pp. 1596-1601, Mar. 6-7, 2009.

Chapman, "Bypassing snoopy logging", Apr. 15, 2011, retrieved from the Internet on Dec. 23, 2014 at http://blog.rchapman.org/post/4921812115/bypassing-snoopy-logging, 5 pages.

Extended European Search Report in EP Application No. 15169625.9, dated Oct. 1, 2015, 7 pages.

Holzmann et al., "Software model checking: extracting verification models from source codet" Software Testing, Verification and Reliability 11.2, year 2001, pp. 65-79.

Liu et al., "Binary Code Analysis," Computer, vol. 46, No. 8, pp. 60-68, Aug. 2013.

Office Action issued in European Application No. 15169625.9 dated Feb. 3, 2016, 6 pages.

Office Action issued in European Application No. 15169625.9 dated Jul. 22, 2016, 7 pages.

Zhang et al., "Combining Static and Dynamic Analysis to Discover Software Vulnerabilities," Innovative Mobile and Internet Services in Ubiquitous Computing (IMIS), 2011 Fifth International Conference on, pp. 175-181, Jun. 30, 2011-Jul. 2, 2011.

Sneed et al., "Extracting business rules from source code." Program Comprehension, 1996, Proceedings., Fourth Workshop on. IEEE, year 1996. pp. 240-247.

Zitser et al., "Testing static analysis tools using exploitable buffer overflows from open source code." ACM SIGSOFT Software Engineering Notes. vol. 29. No. 6. ACM, 2004. pp. 97-106.

* cited by examiner

CLASSIFYING SYSTEM-GENERATED CODE

CROSS-REFERENCE TO RELATED APPLICATION

This application claims benefit of priority to U.S. Application No. 62/611,733, filed on Dec. 29, 2017, the entire contents of which are hereby incorporated by reference.

BACKGROUND

This specification relates to static analysis of computer software source code.

Static analysis refers to techniques for analyzing computer software source code without executing the source code as a computer software program.

Source code is typically maintained by developers in a code base of source code using a version control system. Version control systems generally maintain multiple revisions of the source code in the code base, each revision being referred to as a snapshot. Each snapshot is a representation of the source code of the code base as the source code existed at a particular point in time. A snapshot may be thought of as including all the source code as of the point in time, although all the source code need not be explicitly stored for every snapshot. Source code in a code base is typically compiled in a build environment by a build system. A build environment can include an operating system; a file system; executable files, e.g., compilers; and configuration files for building source code in the code base.

Aspects of static analysis include attributing source code contributions and generating data representing trends in code bases. Attributing source code contributions means attributing changes introduced by a snapshot to a particular developer entity responsible for committing the snapshot. A developer entity can be a single developer or a group of multiple developers. For example, a developer entity can be a lone developer, developers on a team, developers within an organization or within a department of an organization, or any other appropriate group of developers.

Static analysis systems can compute sophisticated metrics of source code contributions and present visualizations of such information. For example, a static analysis system can generate a lines-of-code graph that illustrates net lines of code contributed to a code base by one or more developer entities during a particular time period.

Another example of information computed by static analysis systems is attributing violation introductions and removals between snapshots in a revision graph of the code base. A static analysis system can perform one or more violation matching processes between snapshots in the revision graph of the project. Violations that are unmatched between snapshots in the revision graph can be attributed to responsible developer entities as violation introductions or violation removals. For example, a violation that occurred in a first snapshot but was not matched to any violations in a subsequent snapshot is a violation that was removed by an developer entity responsible for committing the subsequent snapshot. Conversely, a violation that occurred in a subsequent snapshot that was not matched to any violations in a previous snapshot is a violation that was introduced by an developer entity responsible for committing the subsequent snapshot. Example techniques for matching and attributing violations are described in commonly owned U.S. patent application Ser. No. 14/696,185, for "Source Code Violation Matching and Attribution," which is incorporated here by reference.

Some source code of code bases analyzed by static analysis systems is automatically generated source code. Such automatically generated source code will be referred to as system-generated code in order to distinguish it from source code that was actually written by a developer entity. Often the system-generated code is generated during a build process for the code base. System-generated code can be generated by build scripts or actual source code generators.

Source code generators are software applications that can generate source code by processing a specification, which is typically written in a particular metalanguage. Examples of such generators include Bison, JAXB, and XmlBeans.

System-generated code can be problematic for static analysis for a variety of reasons. First, very small changes to the code base can lead to drastic changes in the system-generated code. For example, changing one line in a source code generator specification can result in thousands of lines of system-generated code that all differ from a previous snapshot of the code base. This introduces a type of data pollution that obscures, or makes it more difficult to draw conclusions from, the differential changes between snapshots.

Second, attributing system-generated code often attributes too much credit or too much blame to developer entities. For example, in the case where changing just a few lines of a code generation specification results in thousands of changed lines of system-generated source code, attributing the thousands of changed lines to a developer entity can give too much lines-of-code credit to the developer entity. Conversely, if the system-generated source code contains errors, attributing the errors to a developer entity can attribute too many errors to the developer entity because the system-generated errors were not the fault of the developer entity.

In addition, system-generated code can overwhelm the apparent changes in the source code base. In some cases, the amount of system-generated code can be orders of magnitude greater than source code that was actually written by developer entities. This phenomenon can make it difficult to determine how much source code is actually in a project and how the amount of source code is changing over time.

SUMMARY

This specification describes how a system can classify source code as system-generated source code. As used in this specification, system-generated source code is source code that is automatically generated. The system can use the classification of source code as system-generated in order to improve the accuracy of static analysis.

Particular embodiments of the subject matter described in this specification can be implemented so as to realize one or more of the following advantages. Classifying system-generated source code makes source code attribution more accurate and makes small and large changes to source code projects easier to understand. Ignoring changes in system-generated source code can be performed without losing any accuracy or completeness of the static analysis results. In addition, ignoring system-generated source code can make automatic building of arbitrary code bases faster and therefore more scalable because vast amounts of system-generated code does not need to be painstakingly processed for matching violations and corresponding attributions. In addition, alerts in the system-generated code can be ignored or deprioritized because they are often of little interest to end-users. This makes the analysis results more useful and relevant.

The details of one or more embodiments of the subject matter of this specification are set forth in the accompanying drawings and the description below. Other features, aspects, and advantages of the subject matter will become apparent from the description, the drawings, and the claims.

DETAILED DESCRIPTION

Figure 1:
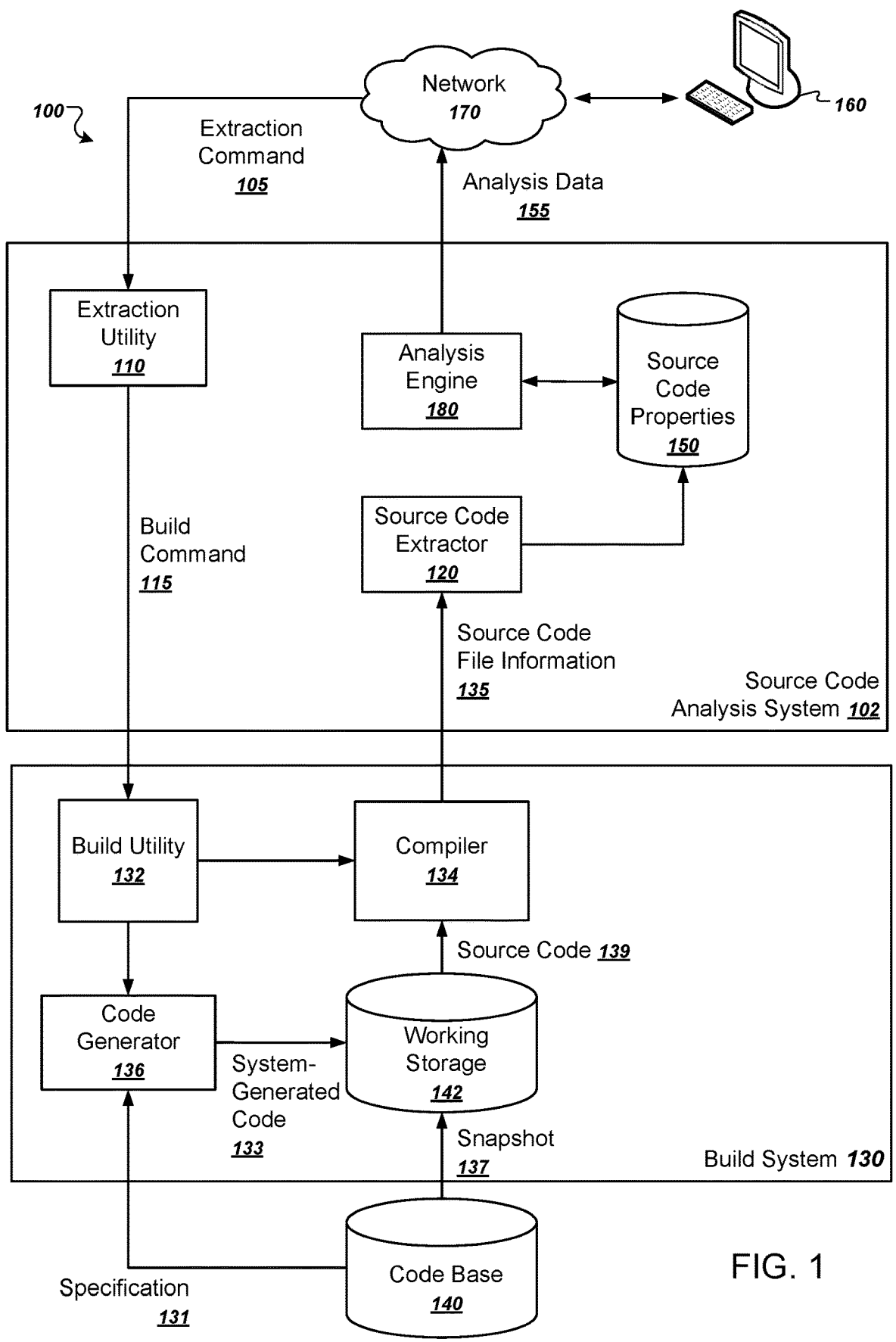
FIG. 1 is a diagram that illustrates an example system.

FIG. 1 is a diagram that illustrates an example system 100. The system 100 includes a user device 160 in communication with a source code analysis system 102 over a network, 170, which can be any appropriate communications network. The system 100 is an example of a system in which a source code analysis system 102 extracts source code processed by a build system 130.

The source code analysis system 102 includes an extraction utility 110, a source code extractor 120, an analysis engine 180, and a collection of source code properties 150. The components of the source code analysis system 102 can be implemented as computer programs installed on one or more computers in one or more locations that are coupled to each through a network. Alternatively, the source code analysis system 102 can be installed in whole or in part on a single computing device, e.g., the user device 160.

The source code analysis system 102 is in communication with a build system 130. The build system 130 can be installed on a single computer or on multiple computers. For example, the build system 130 can be a distributed build system including thousands of computers that cooperate to build code in the code base 140 in parallel. The source code analysis system 102 and the build system 130 can be installed on different computing devices that are in communication with one another, e.g., using the network 170, or the source code analysis system 102 and the build system 130 can be installed on a same computing device.

The build system 130 builds source code in a code base 140, e.g., using a build utility 132 and one or more compilers, which can be conventional components for building and compiling source code. For example, the build system 130 can use the "make" utility for Linux and Unix systems or a batch script that coordinates compiling of source code in the code base 140.

A user of the user device 160 can provide an extraction command 105 to the extraction utility 110 of the source code analysis system 102. The extraction command 105 is a request to extract precisely the source code that the compiler 134 of the build system 130 is compiling. The extraction utility 110 provides a build command 115 to the build system 130, which causes the build system 130 to perform a build of the code base 140 using the build utility 132.

Each build typically uses working storage 142, which is a storage location that includes source code required for the build. Thus, the build utility 132 can copy source code files of a snapshot 137 into the working storage 142 to initiate the build process. The build utility 132 need not copy all files represented by the snapshot 137 into the working storage 142. Rather, some files can be stored remotely in the code base 140.

In performing a build of the code base 140, the build utility 132 can generate system-generated code. For example, the build utility 132 can invoke a code generator 136. The code generator 136 can generate system-generated code by using one or more metalanguage specifications 131, which may also be stored and version controlled in the code base 140. The code generator 136 can then store the system-generated code 133 in the working storage 142 to be compiled by the compiler 134.

The build utility 132 can call the compiler 134 to obtain and compile source code 139 from the working storage 142. The source code 139 received by the compiler 134 can contain system-generated code 139 as well as source code written by developer entities.

The source code analysis system 102 can instrument the build system 130, which causes the build system 130 to provide source code file information 135 to the source code extractor 120 whenever a source code file is compiled by the build system 130. The source code file information 135 generally specifies the location of a source code file or the source code itself contained in the source code file. Suitable techniques for instrumenting a build system are described in more detail in U.S. Pat. Nos. 9,110,737 and 9,489,182, which are herein incorporated by reference in their entirety. Regardless of the specific instrumentation technique that is used, the source code extractor 120 uses the intercepted source code file information 135 to access precisely the source code that will be compiled by the compiler 134.

The source code extractor 120 can store various properties of the source code in the collection of source code properties 150. One such source code property can be indication of whether or not source code is classified as system-generated source code. To generate this information, the source code analysis system 102 can compare the source code files compiled by the compiler 134 to files modified in the working storage 142 during the build process. This process is described in more detail below with reference to FIG. 2.

The analysis engine 180 can query the collection of source code properties 150 to generate analysis data 155. The analysis data 155 can represent any appropriate static analysis results, e.g., attributions of source code contributions, values of various source code metrics, and visual representations of large scale trends in the code base 140. For each of these items, the system can treat system-generated code differently than code written by a developer entity. For example, when computing attributions, the system can bypass attributing contributions occurring in system-generated code. Similarly, when computing source code metrics for the code base 140, e.g., net lines of code added, the system can ignore system-generated code.

Figure 2:
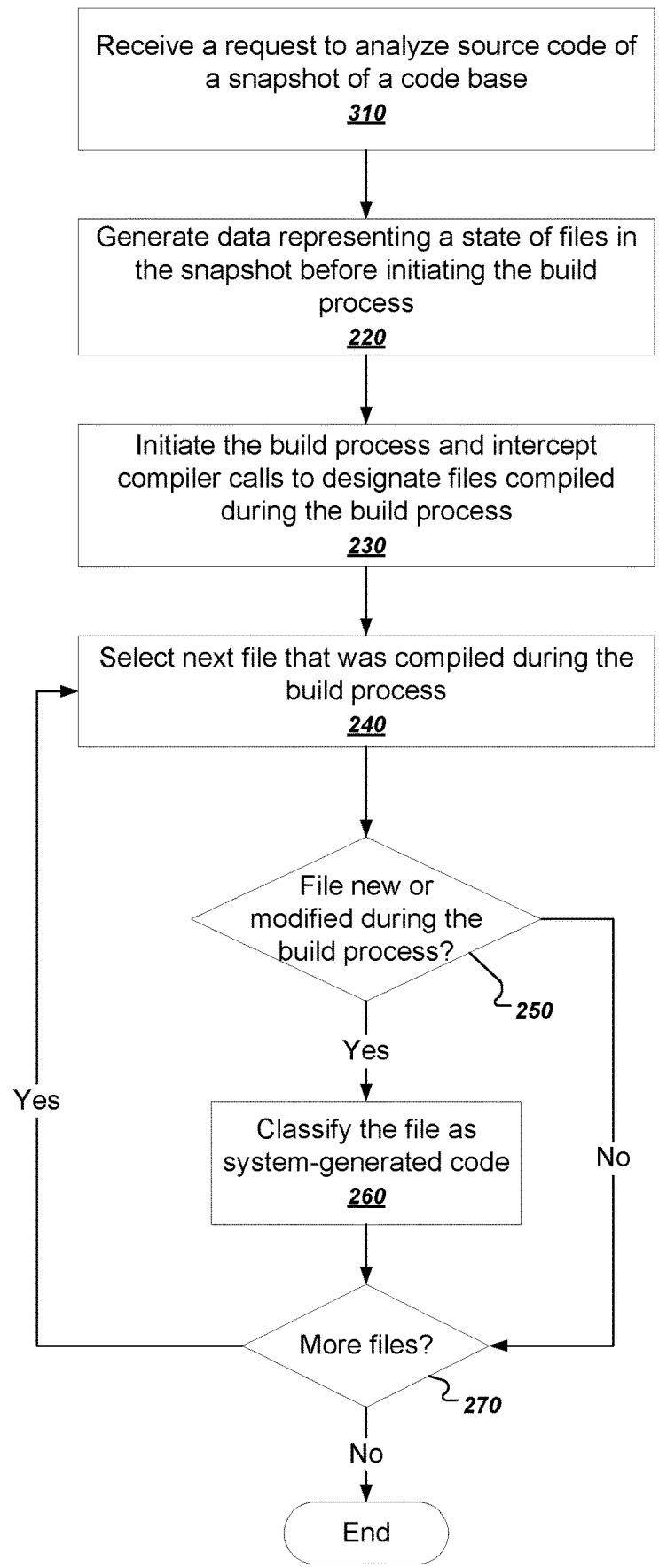
FIG. 2 is a flowchart of an example process for classifying system-generated source code.

FIG. 2 is a flowchart of an example process for classifying system-generated source code. For convenience, the process will be described as being performed by a system of one or more computers, located in one or more locations, and programmed appropriately in accordance with this specification. For example, a source code analysis system, e.g., the source code analysis system 102 of FIG. 1, appropriately programmed, can perform the process.

The system receives a request to analyze source code of a snapshot of a code base (210). As described above, the request can be part of a request to perform static analysis on source code extracted from an instrumented build. During the build process, the build system can generate some system-generated source code files.

The system generates data representing a state of files in the snapshot build initiating the build process (220). For example, the system can generate a catalog that includes, for each file in the snapshot, a file path and a representation of the file's contents, e.g., a content hash of the file. The system can also include timestamp data, e.g., a last-modified time or a creation time for each file in the snapshot.

In some implementations, the system can copy all files of the snapshot to be built to a particular working directory, in which generating the data representing the state of the files involves generating the catalog for all files in the working directory.

The system initiates the build process and intercepts compiler calls to designate files compiled during the build process (230). As described above, during the build process, various build system components, e.g., source code generators, can automatically generate source code that is eventually passed to the compiler during the build process.

For each source code file passed to the compiler during the build, the system intercepts the compiler call. After intercepting the compiler call, the system can record the file path of the source code file passed to the compiler, in addition to extracting source code from the source code file as part of the normal extraction processes.

Therefore, after the build is over, the system will have a complete list of source code files that were compiled by the compiler during the build process. The system can then compare the list of source code files that were compiled with the files that were originally in the snapshot. Thus, the system iterates through the files compiled during the build process by a selecting a next file (240).

The system determines whether the file is new or was modified during the build process (250). The system can compare the file path of the file compiled during the build process with the data representing the state of files in the snapshot before the build process was initiated (step 220). This comparison can either be performed inline as each file is compiled or after the entire build process is complete.

The system can use any appropriate technique to determine whether the file was new or modified. For example, the system can compute a representation of the contents of the file, a content hash or a file size or some combination of these, and determine whether that representation matches the representation generated for the file before the build process was initiated. As another example, the system can determine whether a last-modified time of the file indicates a time that is after the build process was initiated.

If the file was new or modified after the build process was initiated, the system classifies the file as system-generated source code (branch to 260). Otherwise, the system does not classify the file as system-generated source code (branch to 270).

The system then determines whether or not more files have yet to be processed (270). If so, the system selects a next file (branch to 240). If not, the process ends (branch to end).

Figure 3A:
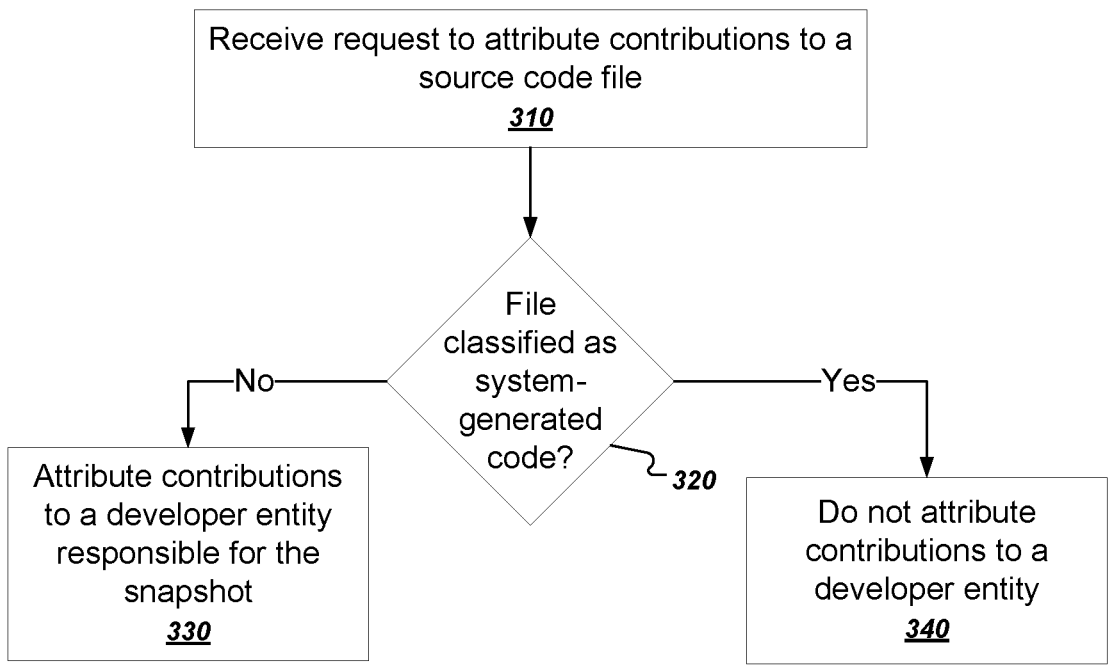
FIGS. 3A and 3B are example static analysis processes that treat system-generated source code differently from non-system-generated source code Like reference numbers and designations in the various drawings indicate like elements.
Figure 3B:
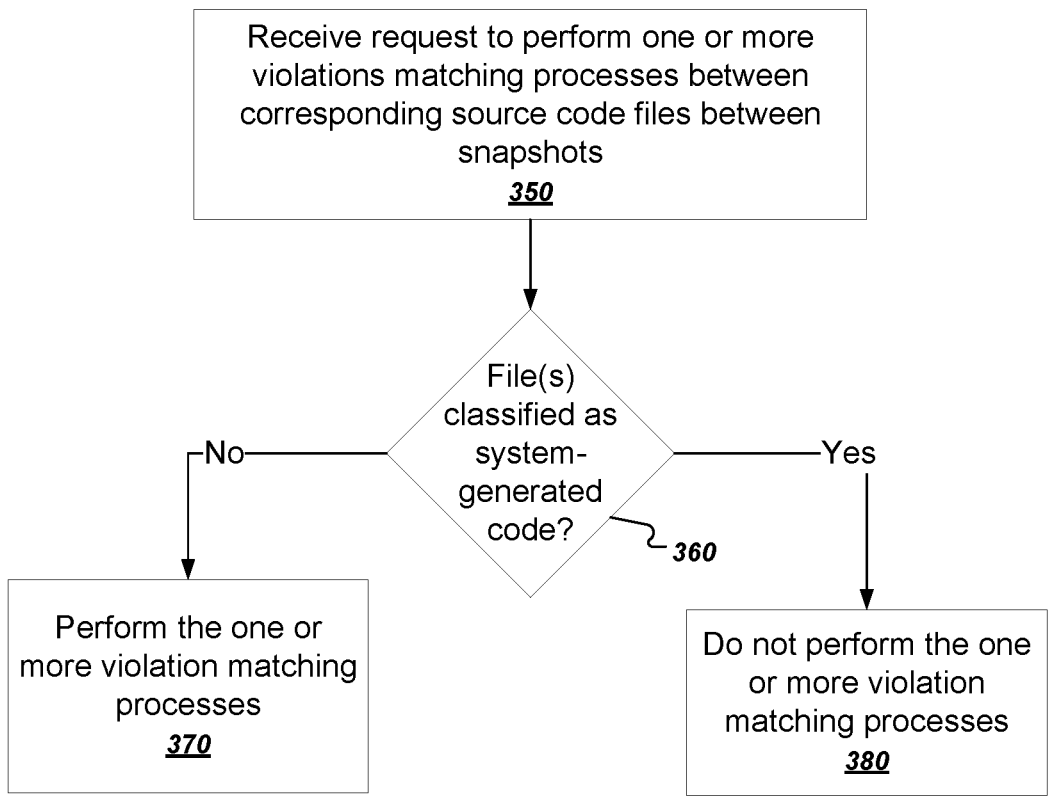

FIGS. 3A and 3B are example static analysis processes that treat system-generated source code differently from non-system-generated source code. For convenience, the processes will be described as being performed by a system of one or more computers, located in one or more locations, and programmed appropriately in accordance with this specification. For example, a source code analysis system, e.g., the source code analysis system 102 of FIG. 1, appropriately programmed, can perform the processes.

In FIG. 3A, for example, a system can receive a request to attribute contributions to a source code file (310). The system can compute contributions by comparing a first snapshot of a revision graph of a code base with a previous snapshot of the revision graph of the code base to determine what changed between the snapshots. In some implementations, the contributions are source code violations. The system can perform one or more violation matching processes between corresponding files in the snapshots to determine which violations were introduced and which violations were removed between the snapshots.

If a file is classified as system-generated code (320), the system does not attribute the contributions to a developer entity (branch to 340). In contrast, for non-system-generated code, the system can attribute the contributions to a developer entity responsible for the subsequent snapshot (branch to 330).

In other words, the system can ignore the system-generated source code files for the purposes of attributing source code contributions to responsible developer entities.

This is often the case when a specification for a source code generator changes between snapshots. In these cases, the resulting system-generated code in the subsequent snapshot can differ substantially from the system-generated code in the previous snapshot. Therefore, without consider system-generated source code, there is a risk of attributing too many violation introductions or violation removals to the developer entity responsible for the subsequent snapshot.

As an example, suppose that relative to a parent snapshot A, a developer entity commits three changes to a child snapshot B:
 (1) changes to a non-system-generated source code file A that introduces 2 violations
 (2) changes to a non-system-generated source code file B that removes 2 violations and introduces 1 violation
 (3) changes to a source code generator specification that introduces 300 violations and removes 100 violations in the resulting system-generated source code In this example, the system can attribute to the developer entity responsible for the child snapshot B, 3 violation introductions and 2 violation removals. The changes in the system-generated source code, which dwarfs all other changes, are ignored.

In FIG. 3B, the system omits system-generated source code files from the violation matching processes altogether. Thus, the system receives a request to perform one or more violation matching processes between corresponding source code files between snapshots (350).

If one or both of the files are classified as system-generated source code (360), the system does not perform the one or more violation matching processes on the files (branch to 380).

On the other hand, the system can perform the one or more violation matching processes on non-system-generated source code files (branch to 370).

Despite the computational advantages of omitting system-generated source code from violation matching processes, in some cases it can still be advantageous to identify new violation sin system-generated source code. For example, severe run-time or security risk violations can still be important violations to identify and to identify when they were introduced into the code base. Therefore, a static analysis system can still identify violations in system-generated source code, but does not necessarily attribute the violations in the system-generated source code to a particular developer entity.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g, a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

In addition to the embodiments described above, the following embodiments are also innovative:

Embodiment 1 is a method comprising:
receiving a request to analyze source code of a snapshot of a code base;
generating data representing a state of source code files of the snapshot before performing a build process for the snapshot;
performing an instrumented build process for the snapshot, including performing operations comprising:
  intercepting each compiler call of a plurality of compiler calls by the build process for the snapshot, and
  designating one or more respective source code files of each compiler call as source code files compiled during the build process for the snapshot;
comparing each source code file designated as a source code file compiled during the build process to the data representing the state of source code files of the snapshot before performing the build process to identify one or more source code files that are new or were modified after the build process was initiated; and
classifying the one or more source code files that are new or were modified after the build process was initiated as source code files having system-generated source code.

Embodiment 2 is the method of embodiment 1, wherein comparing each source code file designated as a source code file compiled during the build process to the data representing the state of source code files of the snapshot comprises:
computing, after compiling each source code file compiled during the build process, a respective representation of the contents of the source code file compiled during the build process; and
determining whether each respective representation of the contents for each source code file matches a previous representation of the contents for the source code file computed before the build process was initiated.

Embodiment 3 is the method of any one of embodiments 1-2, further comprising:
attributing, to a developer entity responsible for the snapshot, only source code contributions to the snapshot that occur in source code files that are not designated as source code files having system-generated source code.

Embodiment 4 is the method of embodiment 3, wherein the source code contributions are violation introductions.

Embodiment 5 is the method of embodiment 3, wherein attributing, to a developer entity responsible for the snapshot, only source code contributions to the snapshot that occur in source code files that are not designated as source code files having system-generated source code comprises computing the source code contributions to the snapshot by comparing non-system-generated source code files of the snapshot to corresponding non-system-generated source code files of a previous snapshot in a revision graph of the software project.

Embodiment 6 is the method of embodiment 5, wherein the snapshot and the previous snapshot are adjacent snapshots in a revision graph of the software project.

Embodiment 7 is the method of embodiment 6, further comprising:
performing an instrumented build process for the previous snapshot and classifying one or more source code files of the previous snapshot as source code files having system-generated code.

Embodiment 8 is the method of embodiment 7, further comprising:
attributing, to a developer entity responsible for the snapshot, only violation removals from non-system-generated source code files of the previous snapshot.

Embodiment 9 is the method of any one of embodiments 1-8, further comprising:
selecting pairs of corresponding files for one or more violation matching processes, including omitting any system-generated source code files from the pairs of corresponding files for the one or more violation matching processes.

Embodiment 10 is a system comprising: one or more computers and one or more storage devices storing instructions that are operable, when executed by the one or more computers, to cause the one or more computers to perform the method of any one of embodiments 1 to 9.

Embodiment 11 is a computer storage medium encoded with a computer program, the program comprising instructions that are operable, when executed by data processing apparatus, to cause the data processing apparatus to perform the method of any one of embodiments 1 to 9.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain some cases, multitasking and parallel processing may be advantageous.

What is claimed is:

1. A system comprising:
   one or more computers and one or more storage devices storing instructions that are operable, when executed by the one or more computers, to cause the one or more computers to perform operations comprising:
     receiving a request to analyze source code of a snapshot of a code base;
     generating data representing a state of source code files of the snapshot before performing a build process for the snapshot;
     performing an instrumented build process for the snapshot, including performing operations comprising:
       intercepting each compiler call of a plurality of compiler calls by the build process for the snapshot, and
       designating one or more respective source code files of each compiler call as source code files compiled during the build process for the snapshot;
     comparing each source code file designated as a source code file compiled during the build process to the data representing the state of source code files of the snapshot before performing the build process to identify one or more source code files that are new or were modified after the build process was initiated;
     classifying the one or more source code files that are new or were modified after the build process was initiated as source code files having system-generated source code; and
     in response to identifying a specific developer entity responsible for committing the snapshot, attributing source code contributions from the snapshot to the specific developer entity, said source code contributions being code contributions that are identified as being non-system generated code.

2. The system of claim 1, wherein comparing each source code file designated as the source code file compiled during the build process to the data representing the state of source code files of the snapshot comprises:
   computing, after compiling each source code file compiled during the build process, a respective representation of contents of the source code file compiled during the build process; and
   determining whether each respective representation of the contents for each source code file matches a previous representation of the contents for the source code file computed before the build process was initiated.

3. The system of claim 1, wherein the source code contributions are violation introductions.

4. The system of claim 1, wherein said attributing comprises computing the source code contributions to the snapshot by comparing non-system-generated source code files of the snapshot to corresponding non-system-generated source code files of a previous snapshot in a revision graph of the software project.

5. The system of claim 4, wherein the snapshot and the previous snapshot are adjacent snapshots in the revision graph of the software project.

6. The system of claim 5, wherein the operations further comprise:
   performing an instrumented build process for the previous snapshot and classifying one or more source code files of the previous snapshot as source code files having system-generated code.

7. The system of claim 6, wherein the operations further comprise:
   attributing, to the developer entity responsible for committing the snapshot, only violation removals from non-system-generated source code files of the previous snapshot.

8. The system of claim 1, wherein the operations further comprise:
   selecting pairs of corresponding files for one or more violation matching processes, including omitting any system-generated source code files from the pairs of corresponding files for the one or more violation matching processes.

9. A computer-implemented method comprising:
   receiving a request to analyze source code of a snapshot of a code base;
   generating data representing a state of source code files of the snapshot before performing a build process for the snapshot;
   performing an instrumented build process for the snapshot, including performing operations comprising:
     intercepting each compiler call of a plurality of compiler calls by the build process for the snapshot, and
     designating one or more respective source code files of each compiler call as source code files compiled during the build process for the snapshot;
   comparing each source code file designated as a source code file compiled during the build process to the data representing the state of source code files of the snapshot before performing the build process to identify one or more source code files that are new or were modified after the build process was initiated;
   classifying the one or more source code files that are new or were modified after the build process was initiated as source code files having system-generated source code; and
   in response to identifying a specific developer entity responsible for committing the snapshot, attributing source code contributions from the snapshot to the specific developer entity, said source code contributions being code contributions that are identified as being non-system generated code.

10. The method of claim 9, wherein comparing each source code file designated as the source code file compiled during the build process to the data representing the state of source code files of the snapshot comprises:
    computing, after compiling each source code file compiled during the build process, a respective representation of contents of the source code file compiled during the build process; and
    determining whether each respective representation of the contents for each source code file matches a previous representation of the contents for the source code file computed before the build process was initiated.

11. The method of claim 9, wherein the source code contributions are violation introductions.

12. The method of claim 9, wherein said attributing comprises computing the source code contributions to the snapshot by comparing non-system-generated source code files of the snapshot to corresponding non-system-generated source code files of a previous snapshot in a revision graph of the software project.

13. The method of claim 12, wherein the snapshot and the previous snapshot are adjacent snapshots in the revision graph of the software project.

14. The method of claim 13, further comprising:
performing an instrumented build process for the previous snapshot and classifying one or more source code files of the previous snapshot as source code files having system-generated code.

15. The method of claim 14, further comprising:
attributing, to the developer entity responsible for committing the snapshot, only violation removals from non-system-generated source code files of the previous snapshot.

16. The method of claim 9, further comprising:
selecting pairs of corresponding files for one or more violation matching processes, including omitting any system-generated source code files from the pairs of corresponding files for the one or more violation matching processes.

17. One or more hardware storage devices comprising physical memory that store instructions that are executable by one or more computers to cause the one or more computers to perform operations comprising:
receiving a request to analyze source code of a snapshot of a code base;
generating data representing a state of source code files of the snapshot before performing a build process for the snapshot;
performing an instrumented build process for the snapshot, including performing operations comprising:
intercepting each compiler call of a plurality of compiler calls by the build process for the snapshot, and designating one or more respective source code files of each compiler call as source code files compiled during the build process for the snapshot;
comparing each source code file designated as a source code file compiled during the build process to the data representing the state of source code files of the snapshot before performing the build process to identify one or more source code files that are new or were modified after the build process was initiated;
classifying the one or more source code files that are new or were modified after the build process was initiated as source code files having system-generated source code; and
attributing, to a developer entity responsible for the snapshot, source code contributions in the snapshot, the source code contributions being contributions that occur in source code files that are not designated as source code files having system-generated code, said attributing including performing operations comprising:
computing the source code contributions to the snapshot by comparing non-system-generated source code files of the snapshot to corresponding non-system-generated source code files of a previous snapshot in a revision graph.

18. The one or more hardware storage devices of claim 17, wherein comparing each source code file designated as the source code file compiled during the build process to the data representing the state of source code files of the snapshot comprises:
computing, after compiling each source code file compiled during the build process, a respective representation of contents of the source code file compiled during the build process; and
determining whether each respective representation of the contents for each source code file matches a previous representation of the contents for the source code file computed before the build process was initiated.

\* \* \* \* \*